UNITED STATES PATENT OFFICE.

CHARLES H. HACKETT AND THOMAS W. MORGAN, OF WATERLOO, IOWA, ASSIGNORS TO WILBUR W. MARSH, OF WATERLOO, IOWA.

CREAM-EXIT FOR CENTRIFUGAL CREAM-SEPARATORS.

1,015,018.      Specification of Letters Patent.      Patented Jan. 16, 1912.

Application filed August 26, 1910. Serial No. 579,028.

*To all whom it may concern:*

Be it known that we, CHARLES H. HACKETT and THOMAS W. MORGAN, citizens of the United States of America, and residents of Waterloo, Blackhawk county, Iowa, have invented certain new and useful Improvements in Cream-Exits for Centrifugal Cream-Separators, of which the following is a specification.

Figure 1:
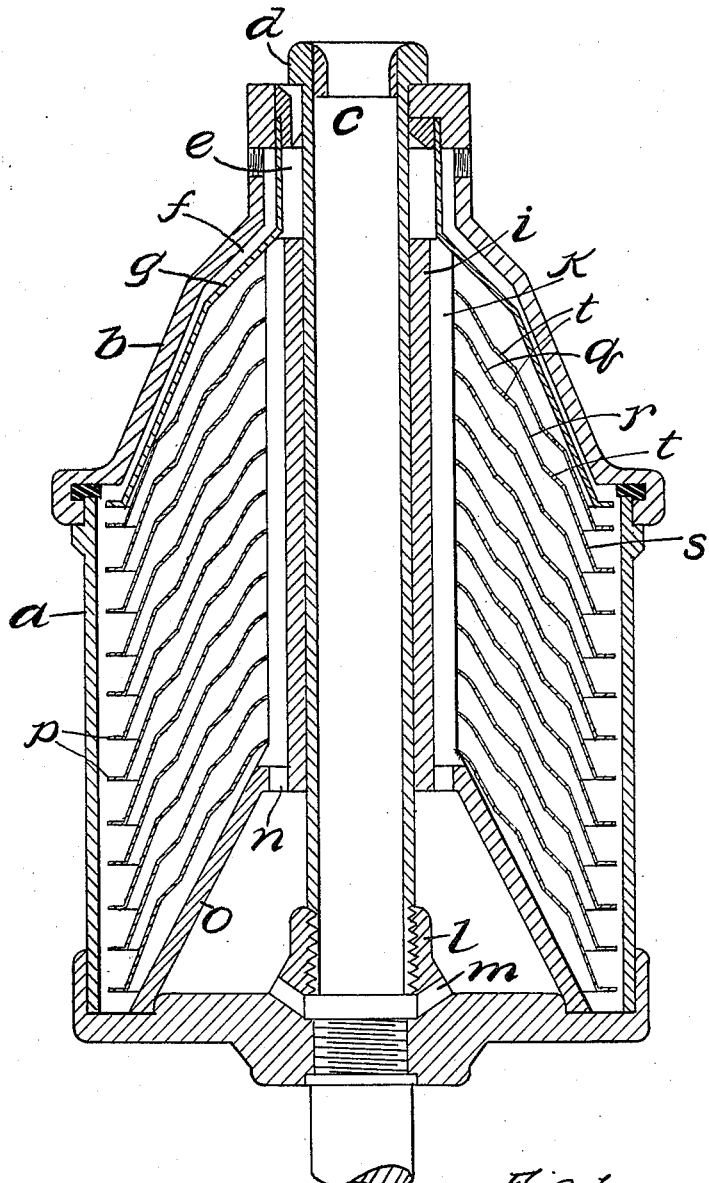
Figure 2:
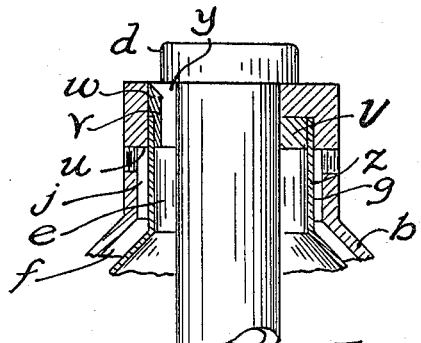
Figure 3:
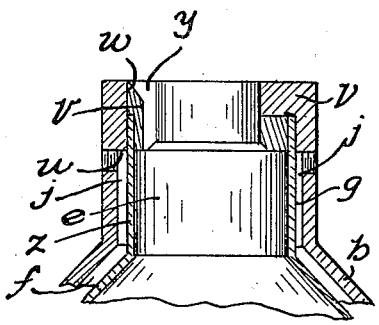
Figure 4:
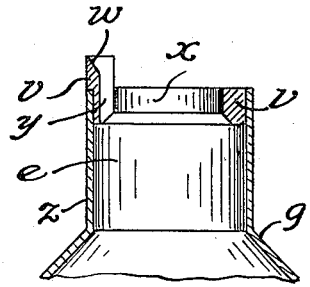
Figure 5:
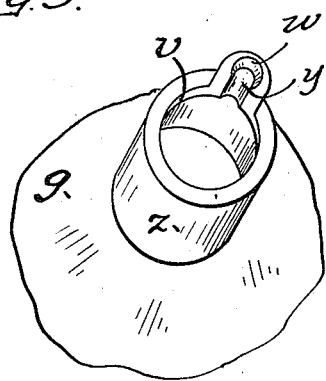

Our invention relates to improvements in cream-exits for centrifugal cream separators, and the object of our improvement is to form the parts of such an exit as to be readily assembled or disassembled, and readily cleaned, while after assembling being effective in operation in the bowl. This object we have accomplished by the means which are hereinafter fully described and claimed, and which are illustrated in the accompanying drawings, in which:

Figure 1 is a central vertical axial section of the bowl of a centrifugal cream separator and its liner, such bowl containing our improved cream-exit also in central vertical section. Fig. 2 is a central vertical axial section of the cover-neck and its contained cylinder. Fig. 3 is another central vertical axial section of the cover-neck and cylinder, but without the clamping-inlet tube therein. Fig. 4 is a central vertical axial section of the hollow cylinder extension of the conical cream diverting hood. Fig. 5 is a perspective view of the said cylindrical extension of the cream diverting hood.

Similar characters of reference refer to similar parts throughout the several views.

The bowl is of a well-known type, comprising a cylindrical hollow body $a$ with a conical separable cover $b$, the cover being secured upon the bowl by means of the clamping inlet-tube $c$, whose flanged upper edge $d$ grasps the upper surface of the cover while its threaded lower end is screwed into an interiorly-threaded boss $l$ on the bottom of the bowl. The hollow of said tube communicates by means of the orifices $m$ in said boss $l$ with the interior of the bowl $a$ and delivers whole milk under a conical expansion $o$ of a hollow cylindrical tube $i$ which is removably fitted over the upper part of the tube $c$. The tube $i$ has a plurality of vertical wings or ridges $k$, upon which are removably mounted the superposed liner hollow frusta $p$, to hold them concentric with the axis of the bowl. Orifices $n$ in the expansion $o$ permit the whole milk to rise through them to be sprayed through the interspaces of said frusta when the bowl is in rapid rotation. Within the cover $b$ of the bowl and spaced away therefrom to provide a milk-exit $f$ is a hollow lining frustum or cream-diverting hood $g$ whose upper part is in the form of a cylindrical extension $z$.

The opening of the upper part of the cover-neck is narrowed at $u$, the top of the cylinder $z$ being removably fitted within the narrowed part $u$, whereby an uninterrupted channel or annular chamber $j$ is provided between the cover-neck and said cylinder $z$ to communicate with one or a plurality of milk-exits. The skimmed milk, after passing from between the liner frusta enters the channels $f$ and $j$ and thence passes from the bowl, the channels $f$ and $j$ being unobstructed throughout, whereby no currents are formed in the milk and the operation of separation is thereby not interfered with.

The space $e$ within the cylinder $z$ is in line with the cream-zone of the bowl. The opening in the inner upper end of the cylinder $z$ is narrowed at $v$, the narrowed portion $v$ embracing the outer surface of the clamping-tube $c$. Said narrowed portion $v$ has on its inner surface a vertical groove $y$ extending from the space $e$ to the exterior of the cover $b$. The upper end of said groove is beveled outwardly at $w$, to give vent beyond the edge of the overlapping flange $d$ on the said clamping-tube. When the parts are assembled the outer surface of the clamping-tube $c$ closes the open groove $y$ to form thereby a tubular conduit or exit for the ascending cream. This arrangement, aside from the convenience of assembling the parts and the ease of cleaning them when separated, gives greater latitude to the cream-exit, since the inner wall of the exit is the outer wall of said clamping-tube, in line with the inner line of the cream-zone.

Each liner frustum $p$ is seated about the milk-inlet tube and with its central opening permitting passage therethrough of the cream in the cream-zone. These frusta are superposed in the usual manner and together fill the cavity of the bowl.

Having described our invention, what we claim as new, and desire to secure by Letters Patent, is:

In a centrifugal cream separator, a rotary bowl having a removable cover secured thereto, and having both a milk-exit and an axial orifice, a hollow clamping-bolt, flanged outwardly at the top to bear upon the top of said cover around said orifice, and adapted to pass through said orifice and to be detachably secured to the bottom of the bowl, with its interior hollow effecting communication between the exterior and interior of the bowl, the inner wall of said axial orifice being grooved to a depth extending outwardly beyond the flange of said clamping-device, a distributing-partition within and spaced away from the said cover and having an upward extension removably seated and closed at its top within said cover to direct the skimmed-milk toward the milk-exit, said extension having an upwardly-projecting trough seated in the groove of said axial orifice and delivering beyond the outer wall of the flange on said clamping-device, and said trough opening from the cream-zone only of the bowl.

Signed at Waterloo, Iowa, this 8th day of Aug. 1910.

CHARLES H. HACKETT.
THOMAS W. MORGAN.

Witnesses:
G. C. KENNEDY,
O. D. YOUNG.

Copies of this patent may be obtained for five cents each, by addressing the "Commissioner of Patents, Washington, D. C."